July 11, 1944.   E. A. MILLER   2,353,579
DRIVE FASTENER
Filed June 30, 1942
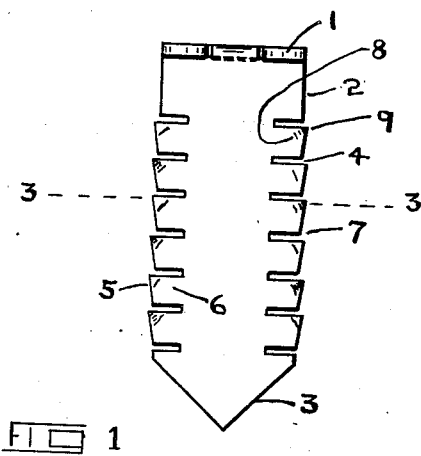
FIG. 1
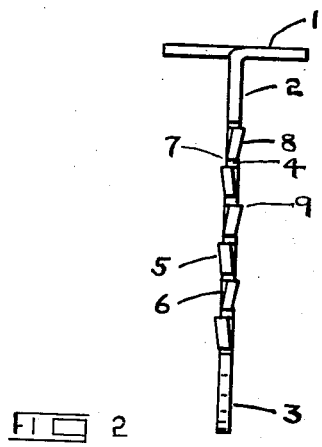
FIG. 2
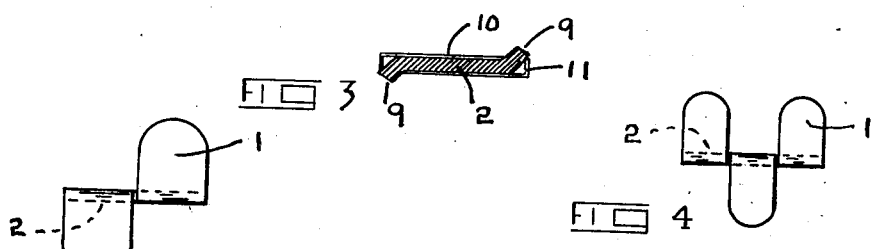
FIG. 3   FIG. 4
FIG. 5
EDWIN AUGUST MILLER *INVENTOR.*
BY
George Henry Elwell
ATTY Patented July 11, 1944

2,353,579

UNITED STATES PATENT OFFICE 2,353,579

DRIVE FASTENER

Edwin August Miller, New Haven, Conn.

Application June 30, 1942, Serial No. 449,066

1 Claim. (Cl. 85—11)

This invention relates to permanent securing means for axially driven fasteners within channels or bores provided therefor, and more particularly to such fasteners produced from a single thickness of sheet-stock.

The objects of the invention are to provide a permanent securing means for sheet-stock fasteners adapted to be driven within passages provided therefor in fiber, metal or other stock that is less hard than the material of which the fastening device is made; and to provide for such a sheet-stock fastener integral resilient edge portions having cutting shoulders extending out of the plane of the shank of the device and beyond the inner wall-surface of the preformed path of the driven shank.

With reference to the accompanying drawing, the Figure 1 is an upright face view of the device; the Figure 2 is an upright side view of the device; the Figure 3 is a cross-section of the device on the line "3—3" of the Figure 1 relative to the inner wall-surface of its preformed path; and the Figures 4 and 5 are top views of the head of the device as preferred and as may be modified.

With more particular reference to the accompanying drawing, the numeral 1 designates the head of the device which may be made as illustrated in the Figures 1, 2 and 4, or as illustrated by the Figure 5, or in any other manner. The shank 2, integral with the head 1 is of flat sheet-metal lying in a vertical plane transverse to the horizontal plane of the head 1, the free extremity of the shank 2 is preferably pointed, as at 3. The opposite vertical edges of the shank 2 are provided at intervals with inwardly extending cuts 4, perpendicular to said edges and a portion of each cut section providing a fin 5 is so twisted out of the plane of the shank 2 that the base 6 and one free corner 7 of the fin section 5 remain in shank alignment. The other free corner 8, by the said twisting of a portion of each section 5 out of the plane of the shank 2, provides a cutting shoulder 9 with which each fin 5 is provided and extending divergently away from the free end 3 of the shank 2, and beyond the inner wall-surface 10 of a socket 11 into which the fastener is driven.

The manner of driving and securing the device within the inner wall-surface 10 of the passage 11 prepared therefor is identical with that described in my U. S. Patent No. 2,296,046 of September 15, 1942, and filed July 14, 1941. The socket or passage 11 designated by the inner wall-surface 10, a cross-section of which is illustrated by the Figure 3, being predetermined and prepared, is adapted to receive the free end 3 of the shank 2, but the cutting shoulders 9, extending beyond the path of the shank 2 within the socket 11, cannot enter the path until force is axially applied to the head 1 to cause the fins 5 to yield inwardly from their normally extended positions and driven within the socket 11, the corner shoulders 9 digging into the inner wall-surface 10 to thus provide abrupt shoulders therein into which the corner shoulders 9 become interlocked therewith permanently thus resisting any attempted withdrawal.

I claim:

A drive fastener including a sheet-stock shank portion having parallel opposite marginal edges; slots extending perpendicular to and within said edges at intervals to provide in the plane of the shank resilient sections therebetween; an upper corner of certain of said sections projecting out of said plane in one direction and upper corners of other sections projecting out of said plane in an opposite direction, said projecting corners overreaching opposite walls of a passage preformed therefor within a receiving work-piece and yielding upon the fastener being urged within the passage, but positively opposing the withdrawal thereof.

EDWIN AUGUST MILLER.